US007089426B1

(12) United States Patent
Bagshaw

(10) Patent No.: US 7,089,426 B1
(45) Date of Patent: Aug. 8, 2006

(54) METHOD AND SYSTEM FOR ENCRYPTION

(75) Inventor: Stephen A. Bagshaw, Thornhill (CA)

(73) Assignee: ATI Technologies, Inc., Thornhill (CA)

( * ) Notice: Subject to any disclaimer, the term of this patent is extended or adjusted under 35 U.S.C. 154(b) by 1046 days.

(21) Appl. No.: 09/669,352

(22) Filed: Sep. 26, 2000

(51) Int. Cl.
*H04K 1/00* (2006.01)

(52) U.S. Cl. ................... 713/193; 380/200; 380/281; 380/282; 380/283

(58) Field of Classification Search ........... 200/201; 380/205, 277, 281, 282, 283, 264, 200; 713/193, 713/171
See application file for complete search history.

(56) References Cited

U.S. PATENT DOCUMENTS 6,173,174 B1 * 1/2001 Jacobs .................. 455/411
6,243,811 B1 * 6/2001 Patel ..................... 713/167

OTHER PUBLICATIONS

"High-bandwidth Digital Content Protection System," Revision 1.0; Feb. 17, 2000.

* cited by examiner

*Primary Examiner*—Gregory Morse
*Assistant Examiner*—Thomas Ho
(74) *Attorney, Agent, or Firm*—Toler, Larson & Abel, LLP

(57) ABSTRACT

A method and systems are provided for creating an authentication of secure communications between a software video driver and a video display. A video driver transmitting digital video data deemed high-bandwidth digital content, to a display, can perform authentication to determine if a secure connection has been established with a display. The video driver and the display both generate secret keys which are compared to ensure that the display used is authorized for secure communications. The video driver, communicating with a hardware video controller over a peripheral component interconnect (PCI) bus, can establish an encrypted link with the video driver. The video driver occasionally monitors the display to determine if a secure communications link is upheld. If the connection is determined at any time to be insecure, the video controller can alert the video driver, so that transmission of the video data can be terminated.

25 Claims, 4 Drawing Sheets

METHOD AND SYSTEM FOR ENCRYPTION

FIELD OF THE INVENTION

The present invention relates generally to information handling systems and more particularly to encrypting communications within an information handling system.

BACKGROUND OF THE INVENTION

The entertainment industry is involved in a continual struggle to keep movies from being illegally copied. Unfortunately, the same technological advances that have made distributing high quality movies easier, have made high quality illegal copies easier to produce. Of particular concern is the copying of high-bandwidth digital video content such as DVDs. Various methods have been employed to protect the content of DVDs from being copied illegally. One such method has been to equip DVD players with Macrovision, or a similar copy protection system. Common copy protection systems allow a media player to detect connections to multiple recording devices, and to scramble or otherwise alter the video data so that quality copies cannot be made. Because of the importance of preventing high quality copies from being made, a more secure form of copy protection, known as Content Scrambling System (CSS), was developed. Using CSS, the content of a DVD is encrypted, allowing the content of the DVD to be read only through the use of an encryption key stored on the DVD and a decryption key stored on the DVD player.

The use of encryption to protect DVDs from being illegally copied has been used much more frequently as DVD use has expanded. Many computers are being sold with built-in DVD drives and software players. While the content of the video and audio data in the DVD is encrypted, once the DVD player software has decoded the content, the content is decrypted and unsecured. Video controllers can be made with stored encryption keys that correspond to encryption keys on digital displays, allowing the content between the video controller and the display to be encrypted; however, installing a unique set of encryption keys during the production of the video controller hardware can be expensive. Furthermore, no insurance can be made of the security of data between the system's software and the video controller, within the information handling system.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE FIGURES

At least one embodiment of the present invention provides a method for establishing an encrypted link between a peripheral device and a software component, as part of an information handling system. The method comprises generating a first seed key common to both the peripheral device and the software component. The method also includes providing the first seed key and a public encryption key associated with the peripheral device to a hardware controller. The method further includes generating in the hardware controller, using the first seed key and the public encryption key, a second seed key, different from the first seed key. The second seed key is used to encrypt communications between the software component and the hardware controller. An advantage of at least one embodiment of the present invention is that communications between a software component in an information handling system and a hardware controller can be secured using encryption unique to a software component and peripheral device combination. Another advantage of at least one embodiment of the present invention is that by downloading encryption keys from a network, eliminating the need to install multiple sets, or a unique set, of encryption keys on hardware controllers, production costs of hardware controllers can be reduced.

Figure 1:
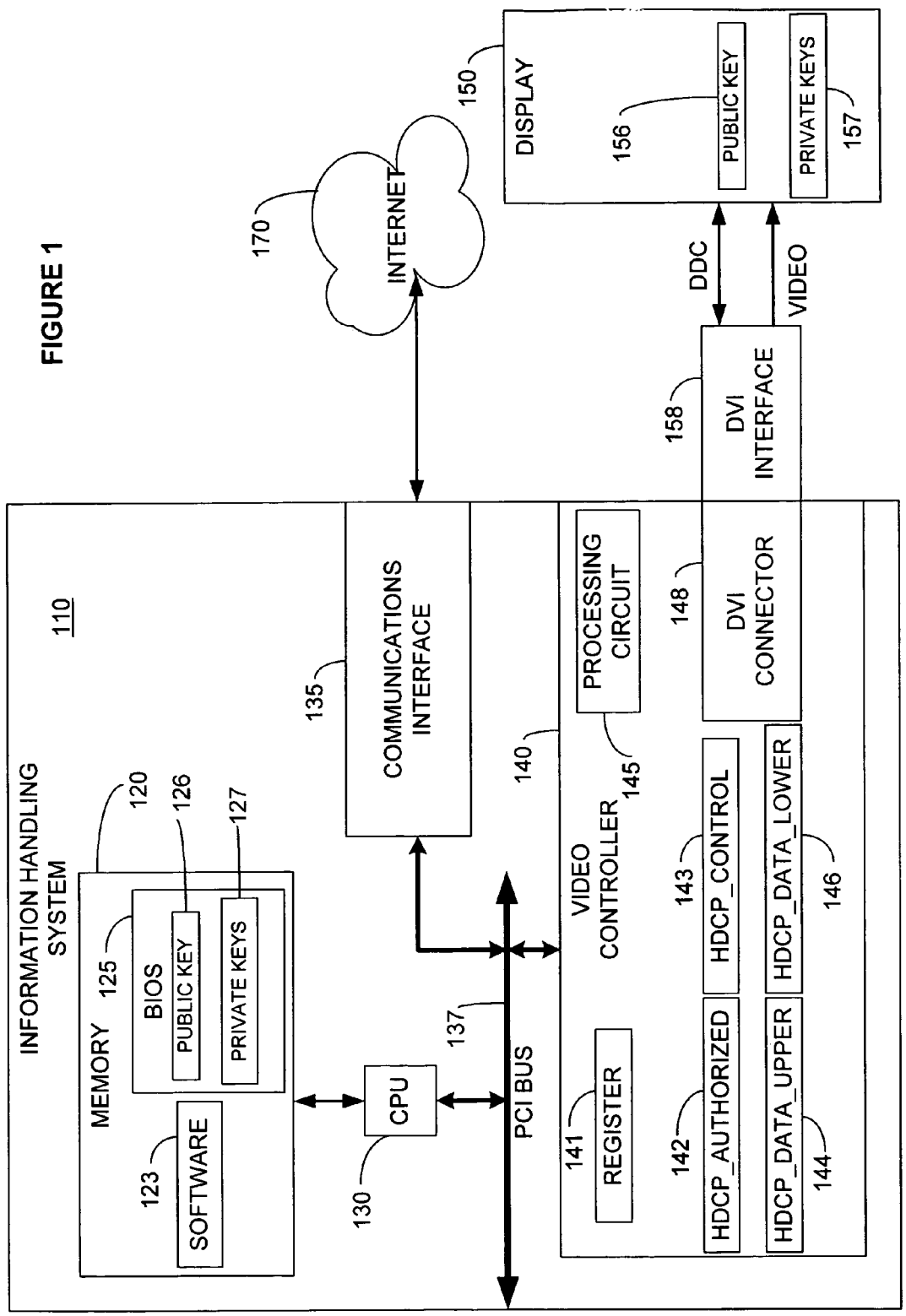
FIG. 1 is a block diagram illustrating an information handling system with an interfaced display, featuring key components according to at least one embodiment of the present invention.

Referring now to FIG. 1, a display is shown as part of an information handling system containing a software component, through a video controller, according to at least one embodiment of the present invention. Secure connections can be established between a software component, such as video driver 123, a video controller 140, and a display 150. Video driver 123 monitors and controls the flow of data, such as digital video disk (DVD) data to display 150 connected to video controller 140, dependent on whether the secure connection is maintained. In one embodiment of the present invention, display 150 is a digital video interface (DVI) compliant display which is connected to system 110, using a DVI interface 158 connected to a DVI connector 148. However, in at least one embodiment, display 150 can also be another type of display, a repeater with a plurality of displays connected to it or any other peripheral device used to transfer data.

When a DVD is being played through a DVD player connected to system 110, the content of the DVD can be read using a DVD drive and DVD player software (not shown). The DVD data is sent to a software component, such as video driver 123, run in memory 120 by a central processing unit (CPU) 130. Video driver 123 transmits a software public key 126 to the connected display 150. Software public key 126 can be loaded from a basic input/output system (BIOS) chip. Alternatively, software public key 126 and any necessary private keys 127 can be downloaded from a network, such as the Internet 170, through a communications interface 135. The key is sent over peripheral component interconnect (PCI) bus 137. PCI bus 137 can also be used to communicate with other devices in system 110, such as an audio card (not shown), communications interface 135, etc. It will be appreciated that other internal bus types may be used, such as the Video Electronic Standards Association local bus (VLB), the industry standard architecture (ISA) bus, or the extended ISA (EISA) bus, without departing from the spirit or scope of the present invention.

Display 150 also transmits its public key, monitor public key 156, to video driver 123, through video controller 140. In one embodiment, video driver 123 checks monitor public key to determine if it is on a list of revoked keys. If the key has been revoked or it is not transmitted, a value can be written into register HDCP_AUTHORIZED to indicate that display 150 is not authorized for secure communications. If the device connected to DVI connector 148 is a repeater (not shown) connected to a plurality of displays, the key of each display is preferably monitored to ensure that they are all authorized for secure communications.

When video driver 123 receives monitor public key 156, it uses that key to select from private keys 127, as is described subsequently in FIG. 2. The chosen private keys are then added together. This summation generates a secret seed key, Km which can be used for authentication and encryption. Video driver 123 sends the value of Km to video controller 140, where it is stored in registers HDCP_DATA_UPPER 144 and HDCP_DATA_LOWER 146. A manipulation of Km, such as through an orthogonal transformation, is performed to generate another value, $R_0$. In one embodiment, Km is loaded into a least first shift register and a known number of clock cycles is applied to the LFSR. Select bits output from the LFSR are used to generate $R_0$. $R_0$ can be stored in memory 120, or in a temporary register, such as register 141.

When display 150 receives software public key 126, it uses that key to select from private keys 157. The chosen private keys are added together to generate a secret seed key, Km' which can be used for authentication. Manipulation is performed on Km', as was discussed for generating $R_0$ from Km, to generate a value $R_0'$. Display 150 transmits the $R_0'$ value to video controller 140.

Video controller 140, under the control of processing circuit 145, can compare the stored $R_0$ and $R_0'$ values. If display 150 is an authorized display, Km and Km' should be the same value and $R_0$ and $R_0'$ should be equal. If the values are not equal, video controller 140 can terminate communications, continue trying to find an authorized connection, or simply notify video driver 123 of the unauthenticated condition. If $R_0$ and $R_0'$ are equal, display 150 is considered authenticated, and a value is written to register HDCP_CONTROL 142 to indicate that authentication is complete. Once the display is authenticated, video controller 140 is left to handle authentications of the secure connection with display 150. If display 150 is removed or another display is connected, it is the job of video controller 140 to notify video driver 123 so that software can update communications status accordingly, and take any necessary actions, such as terminating communications with display 150. Authentication, encryption, and other functions performed by video controller 140, can be performed using processing circuit 145. In one embodiment, processing circuit 145 is a hardware circuit, or collection of circuits, dedicated to encrypting and decrypting information, while in other embodiments, processing circuit 145 is a microcontroller or other processor that is used in conjunction with appropriate software to perform a wide variety of functions on video controller 140.

Communication along PCI bus 137, between video driver 123 and video controller 140 is preferably encrypted. In one embodiment, the value of Km (supplied by video driver 123) is combined with the value of monitor public key 156 by rearranging the bits of the combined value in a predefined ordering. The combination can be performed using a simple summation. The combination of the values of Km and monitor public key 156 can be used to generate an encryption key, herein referred to as the PCI key. Video controller 140 and video driver 123 can encode transmissions between each other on PCI bus 137 through a mathematical transformation, such as an orthogonal transform involving the PCI key. In one embodiment, an exclusive OR (XOR) calculation is performed between the data to be transmitted and the PCI key to encode transmissions. Since both video controller 140 and video driver 123 have knowledge of the PCI key, data between them can be encoded, transferred, and decoded.

Communication of non-video data between display 150 and video controller 140 is handled through DVI connector 148 and DVI interface 158 using an $I^2C$ compliant display data channel (DDC) line. It will be appreciated that other suitable communication protocols and corresponding hardware may be used according to the objectives of the present invention.

Since communication of control values between 140 and 150 are not encrypted in any form, an orthogonal transform can be used to encrypt communications between video driver 123 and video controller 140, using a dynamic encryption key. In at least one embodiment, the original key used for orthogonal encryption is the PCI key. If orthogonal encryption with a dynamic key is implemented, the PCI key can be altered periodically by applying a predetermined transform or a suitable mathematical algorithm to the value of the PCI key. For example, once data is decoded, a new encryption key can be generated using a combination of the value of Km with the decoded data. Using a dynamic encryption key, the communicating devices, such as video driver 123 and video controller 140, or display 150 and video controller 140, alter the encryption keys to provide added security. Alternatively, the function used for the orthogonal encryption can be dynamically altered to change the encryption scheme.

In one embodiment of the present invention, after an orthogonal encrypted link has been established on PCI bus 137, video driver 123 can send software public key 126 and an encrypted private decryption key, downloaded from the Internet 170, to video controller 140, through PCI bus 137. Monitor public key 156 can also be sent to video controller 140, through DVI connector 148, by display 150. After receiving all the necessary encryption and decryption keys, video controller 140 can use the encryption keys to implement public key encryption. Keys associated with video controller 140 can also be downloaded from a network, such as the Internet, to initiate public key encryption between video driver 123 and video controller 140.

Figure 2:
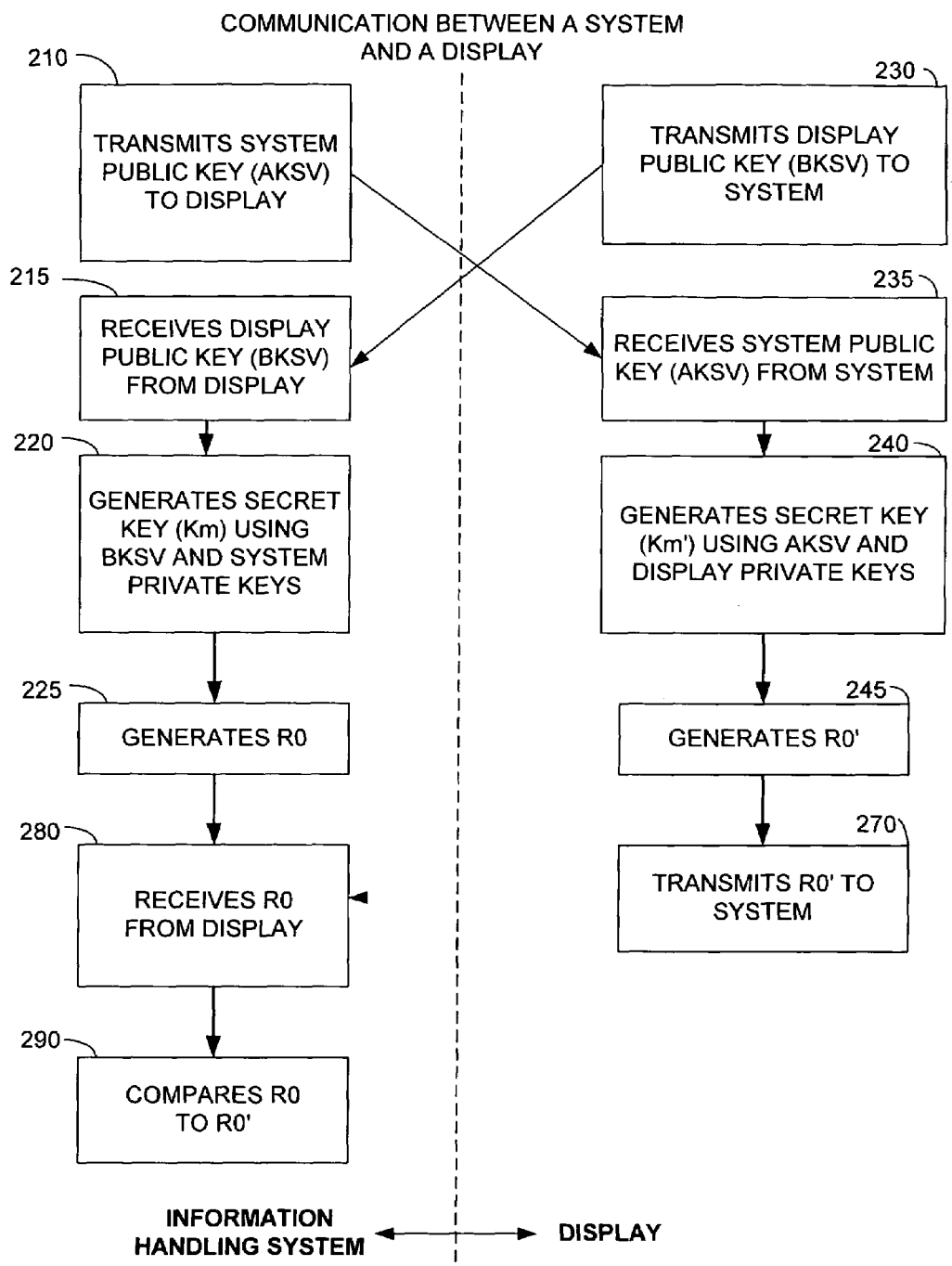
FIG. 2 is a chart illustrating a method of authenticating secure connections between an information handling system and a display, according to at least one embodiment of the present invention.

Referring now to FIG. 2, a diagram is shown illustrating the steps taken during the authentication of a display. When initiating communications with a display, a video driver can initiate and execute the steps describe in FIG. 2 to insure that the display is authorized for secure communications.

In step 210 an information handling system transmits a public key associated with its video driver, to a connected display. The public key will be referred to as key selector vector-A (AKSV). In step 235, AKSV is retrieved by the connected display. In step 240, the connected display uses the placement of binary 1's in AKSV to choose a subset of private keys from a stored collection of private keys located in the display. For example, if the location of 1's in AKSV are in the 0th, 4th, and 5th bit locations, as in the hexadecimal value 0x31 (110001 in binary), the display would choose the 0th, 4th, and 5th private keys stored in an indexed array in the display. In one embodiment, AKSV is a 40-bit value with 20 1's and 20 0's, allowing the display to select 20, 56-bit private keys. It will be appreciated that the size of the keys used can be altered without departing from the scope of the invention. The selected private keys are preferably summed together, generating a secret seed key, Km'. In step 245, the lower Km' value is manipulated to form another 16-bit value $R_0$'. In step 270, $R_0$' is transmitted to the information handling system. $R_0$' can be encoded before being transmitted to the information handling system, such as through an orthogonal transform with the display's public key or the calculated seed key, Km'. In another embodiment, $R_0$' would not need to be encoded.

The connected display also transmits its public key, as in step 230. The display's public key will be referred to as the key selector vector-B (BKSV). In step 215, the information handling system retrieves BKSV. In step 220, the information handling system employs similar steps as the display's step 240 to calculate a secret seed key. The information handling system uses the connected display's public key, BKSV, to choose among its stored private keys. The information handling system chooses its private keys dependant on the locations of 1's in the binary value of BKSV. For example, if the location of 1's in BKSV are in the 0th, 2nd, and 4th bit locations, as in the hexadecimal value 0x15 (10101 in binary), the display would choose the 0th, 2nd, and 4th private keys stored in an indexed array in the information handling system. BKSV can be a 40-bit value with 20 1's and 20 0's, allowing the display to select 20 private keys. The selected private keys are preferably summed together, generating a secret seed key, Km. In step 225, the information handling system generates a 16-bit value, $R_0$ through an orthogonal transformation of Km. In one embodiment of the present invention, the sets of encryption keys associated with the information handling system are downloaded from a network, such as the Internet.

In step 280, the information handling system receives $R_0$' from the display. The R0' is transmitted to the video controller 140. If $R_0$' is encrypted or encoded, the information handling system can follow any necessary steps to decrypt or decode $R_0$'. In step 290, the stored $R_0$ (taken from the seed key Km transmitted by the video driver) is compared to the received $R_0$', in the information handling system. If the connected display is an authorized display and the private keys and the public key are authorized, the calculated seed values, Km and Km' should be equal. For example, in the described embodiment, if the 0th, 2nd, and 4th private keys of the video driver were hexadecimal values 0x23,0xA2, and 0x30, respectively, the value of Km would be 0x23+0xA2+0x30, or 0xF5. If the display were an authorized display with 0th, 4th, and 5th private keys having hexadecimal values of 0x21, 0x31, and 0xA3, respectively, Km' would equal 0x21+0x30+0xA3, or 0xF5. Thus, if the connected display is authorized, the calculations of Km and Km' should result in equal values.

Once, the video controller compares the value of $R_0$' to $R_0$, video controller 140 (FIG. 1) provides video driver 123 (FIG. 1) with the results of the comparison. If Km and Km' are equal, $R_0$ and $R_0$' should also be equal. If $R_0$ and $R_0$' are not equal, the connected display is considered unauthorized and the video driver preferably does not send video data to the connected display; however, if $R_0$ and $R_0$' are equal, the video driver considers the display authorized and allows the video data to be transmitted to the display. Alternatively, if no data is received by the information handling system, as in steps 215 and 280, the connected device is automatically considered unauthorized. In a preferred embodiment, a software video driver performs most of the authorization in the information handling system. Once the display is considered authorized, the video driver turns over further authentication to a hardware video controller, allowing the software and other system resources to be freed for other tasks.

Figure 3:
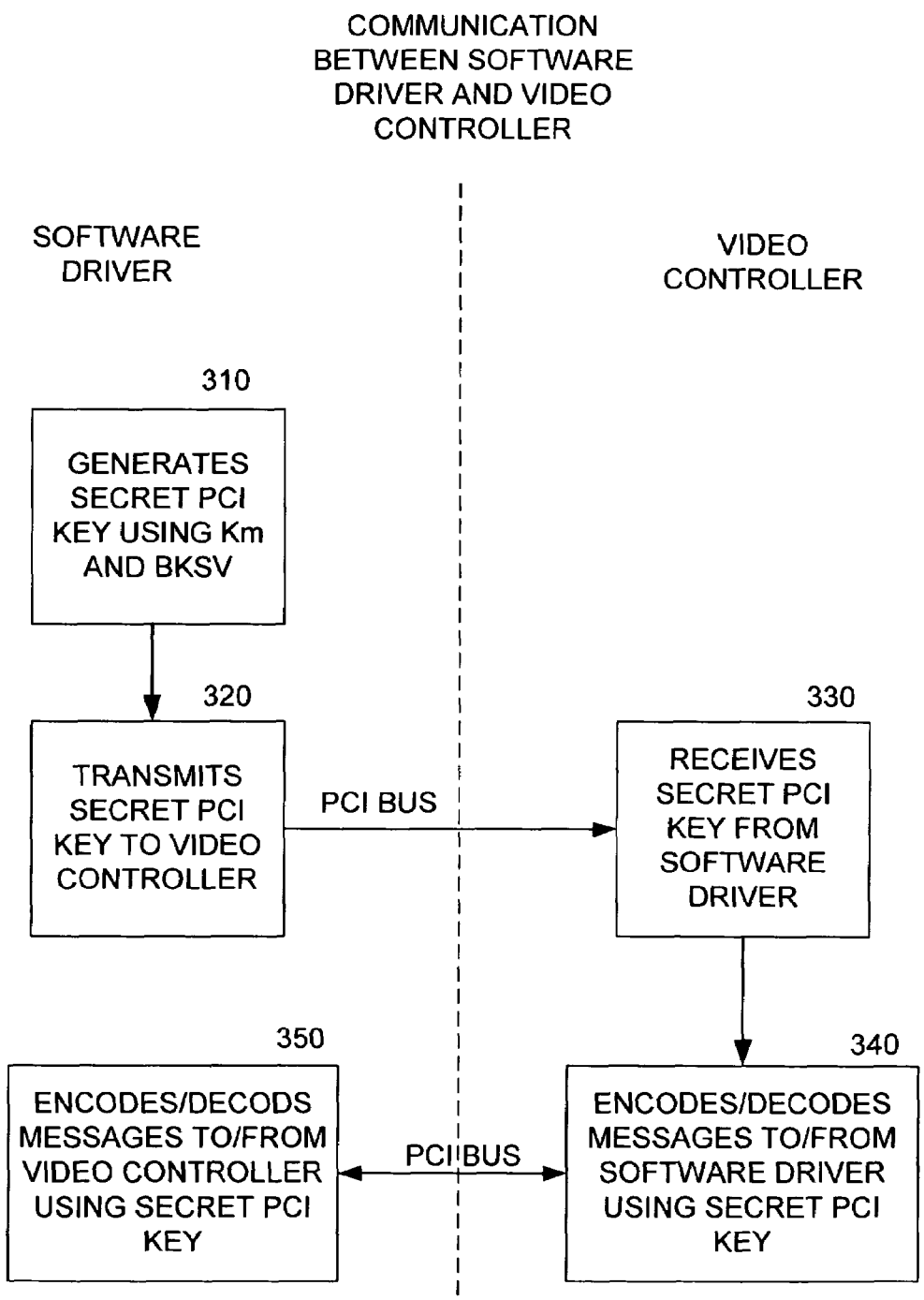
FIG. 3 is chart illustrating a method to secure communications between a software video driver and a video controller, according to at least one embodiment of the present invention.

Referring now to FIG. 3, a diagram of the steps used to perform secured connections between a software video driver and a hardware video controller are shown, according to one embodiment of the present invention. Communication between the video driver and the video controller is preferably encoded with a secret key.

In step 310, the video driver generates a secret key, hereinafter referred to as the PCI key, for encoding communications over the PCI bus. The video driver combines the secret seed key, Km, with a display's public key, key selection vector-B (BKSV). The video driver can generate the PCI key by concatenating the Km and BKSV values and rearranging the ordering of bits in a predefined ordering. Alternatively, the video driver can perform other functions, such as multiplication or another suitable transform, to generate the PCI key from Km and BKSV. In step 320, the video driver transmits the PCI key to the video controller over the peripheral component interconnect (PCI) bus. In step 330, the video controller receives the PCI key from the video driver, through the PCI bus. In step 340, the video controller uses the PCI key to encode and decode messages sent to and from the video driver. In step 350, the video driver also uses the PCI key to encode and decode messages to and from the video driver. The PCI key can be dynamic. Both the video driver and the video controller use an orthogonal transform with the PCI seed to encode their messages over the PCI bus. In one embodiment of the present invention, after an encrypted link is established over the PCI bus, the software video driver can securely transfer sets of encryption keys and a private decryption key, downloaded from a network, to establish public key communications with display 150.

Figure 4:
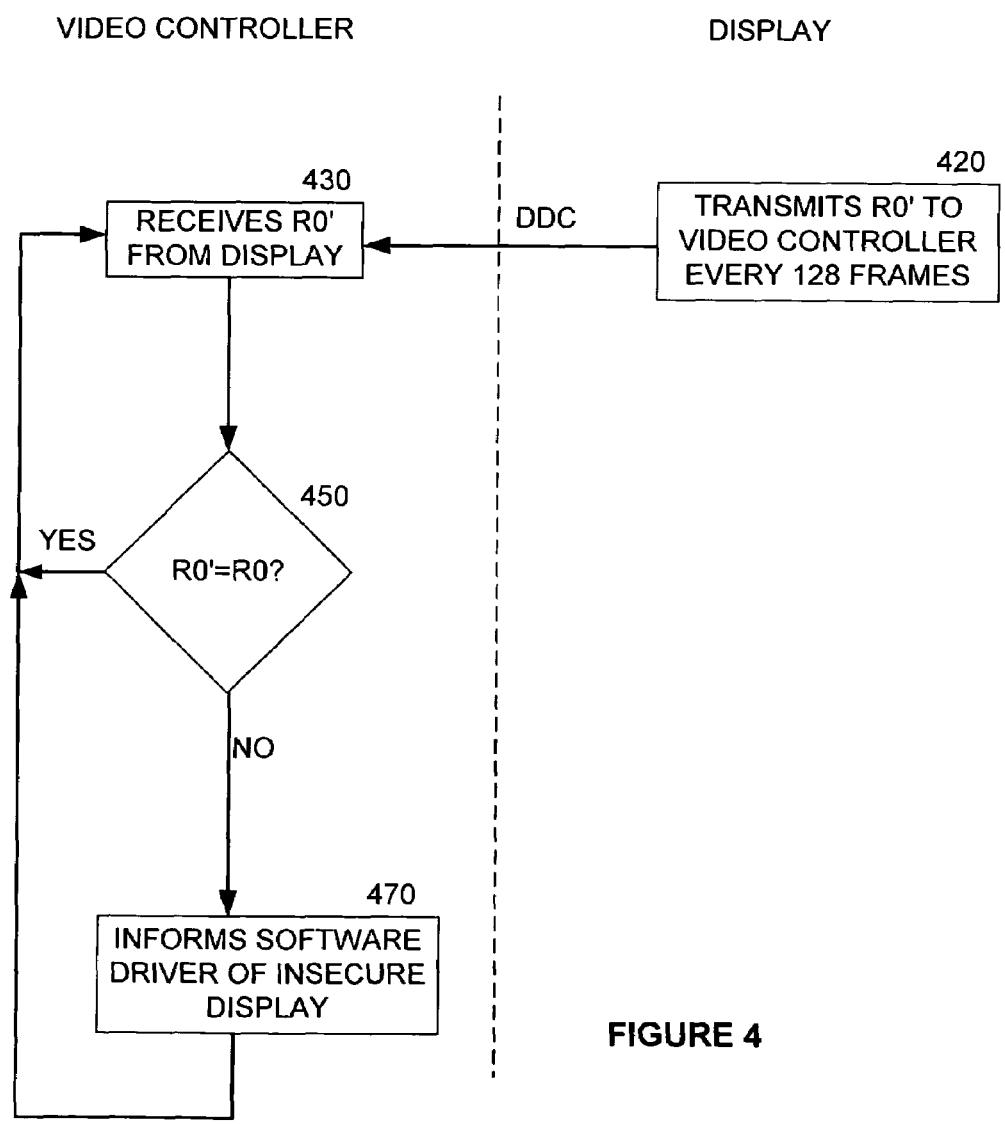
FIG. 4 is a flow chart illustrating a method of authenticating secure communications between a video controller and a display.

Referring now to FIG. 4, a flow chart illustrating authentication between a video controller and a display are shown, according to one embodiment of the present invention. Communication between the video controller and a display is performed to continually verify the security of authenticated devices connected to the video controller.

In step 420, the display transmits $R_0$' to the video controller. In one embodiment, the display transmits the $R_0$' once for every 128 frames displayed. The transmission is preferably sent over the digital data channel (DDC) line on the video controller's digital video interface (DVI) connector, using I$^2$C. protocols. In another embodiment, the display can encode $R_0$' by performing a transform using the display's public key. Alternatively, the display can perform the transform using its calculated seed key, Km'. In addition, other methods can be performed to encode $R_0$' without departing from the scope of the present invention.

In step 430, the video controller receives $R_0$' through the DDC line. In step 450, the video controller compares the received $R_0$' to the stored $R_0$, taken from the seed key (Km), sent by the video driver. It will be appreciated that step 450 can be performed by the video driver in place of the video controller. If $R_0$' is not equal to $R_0$, the display is either not an authorized display, the connection to the display has been terminated, or another display has been connected. In step 470, if $R_0$' is not equal to $R_0$, the video driver is informed of the insecure connection. The video controller can then send the video data to the display unencrypted, allowing it to be displayed, or the video driver can disable the video transmission to the video controller, only allowing secured displays to be used. Devices other than displays can be connected to the video controller. Alternatively, a repeater can be connected to the video controller. A repeater can be used to transmit video to a plurality of displays. If a repeater is used, the repeater preferably transmits key selector vectors from each of the plurality of displays to the video controller for authentication.

The preceding descriptions have shown embodiments of the present invention used to authenticate secure communications between an information handling system with a video controller and a single connected display. Authentication described herein can be performed with other types of connected devices. The present invention can also be performed to securely communicate with a plurality of connected displays, such as through an authorized video repeater with a plurality of connected devices. An embodiment of the present invention can also be implemented in systems other than computers, and can be used to control the transmission of digital data other than video data. For example, at least one embodiment of the present invention could be implemented in a compact disc (CD) player, or in other devices that might benefit from encrypted information transfer. It should now be appreciated by those skilled in the art that the present invention has the advantage that increased security can be achieved by providing for authentication between a software driver and a hardware controller. Another advantage, of at least one embodiment of the present invention, is that encryption can be performed based on an encryption key unique to the software driver and peripheral device combination.

In the preceding detailed description of the preferred embodiments, reference has been made to the accompanying drawings, which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   establishing an encrypted link between a peripheral device and a software component of an information handling system, wherein establishing the encrypted link includes generating a first seed key common to both the peripheral device and the software component;
   providing the first seed key and a public encryption key associated with the peripheral device to a video controller; and
   generating at the video controller, using the first seed key and the public encryption key, a second seed key different from the first seed key, the second seed key to encrypt communications between the software component and the video controller.

2. The method as in claim 1, wherein generating the first seed key is performed by the software component.

3. The method as in claim 2, wherein generating the first seed key includes:
   using the public encryption key associated with the peripheral device to select a plurality of private encryption keys associated with the software component; and
   determining the seed key based upon the selected private keys associated with the software component.

4. The method as in claim 1, wherein generating the first seed key is performed by the peripheral device.

5. The method as in claim 4, wherein generating the first seed key includes:
   using the public encryption key associated with the software component to select from a plurality of private encryption keys associated with the peripheral device; and
   summing the select private keys associated with the peripheral device.

6. The method as in claim 1, further including:
   providing the public encryption key associated with the peripheral device and a private decryption key associated with the software component to the video controller; and
   providing public key encryption between the video controller and the peripheral device.

7. The method as in claim 1, wherein the peripheral device is a display device.

8. The method as in claim 1, wherein establishing further includes the first seed key being based upon the peripheral device and the information handling system.

9. The method as in claim 8, wherein the first seed key is unique to the peripheral device and the information handling system.

10. A video controller comprising:
    a bus connection to receive a first seed key from a software component within an information handling system;
    a digital communications connector to connect to a peripheral device and to receive a public encryption key from said peripheral device;
    a first set of registers to store said first seed key, said first seed key common to both said information handling system and said peripheral device;
    a second register to store said public encryption key; and
    a processing circuit to generate, using said first seed key and said public encryption key, a second seed key different from said first seed key, said second seed key to encrypt communications between said software component and said video controller.

11. The video controller as in claim 10, wherein said information handling system generates said first key and wherein generation of said first key includes:
    using said public encryption key to select a plurality of private encryption keys; and
    combining said selected private encryption keys.

12. The video controller as in claim 10, wherein communications between said video controller and said information handling system are performed over a system bus.

13. The a video controller as in claim 12, wherein said system bus is a Peripheral Component Interconnect bus.

14. The video controller as in claim 10, wherein said digital communications connector is a Digital Video Interface connector.

15. The video controller as in claim 10, wherein said video controller is a video controller.

16. The video controller as in claim 10, wherein said peripheral device is a display device.

17. A system comprising:
- a processor coupled to a system bus;
- memory coupled to said system bus for use by said processor;
- a collection of instructions to be stored in said memory and executed by said processor, said collection of instructions including instructions to establish an encrypted link between said system and a peripheral device, wherein establishing said encrypted link includes generating a first seed key common to both said peripheral device and said system, said collection of instructions further including instructions to deliver said first seed key to a video controller; and
- said video controller including:
  - a bus connection to receive said first seed key;
  - a digital communications link to connect to said peripheral device and to receive a public encryption key from said peripheral device;
  - a first set of registers to store said fist seed key;
  - a second register to store said public encryption key; and
  - a processing circuit to generate, using said first seed key and said public encryption key, a second seed key different from said first seed key, said second seed key to encrypt communications between said system and said video controller.

18. The system as in claim 17, wherein said memory includes random access memory and read-only memory.

19. The system as in claim 17, wherein generating a first seed includes:
- using said public encryption key to select a plurality of private encryption keys; and
- combining said selected private encryption keys.

20. The system as in claim 19, wherein said public encryption key and said plurality of private encryption keys are located in said memory.

21. The system as in claim 17, wherein said system bus is a Peripheral Component Interconnect bus.

22. The system as in claim 17, wherein said digital communications link is a Digital Video Interface connector.

23. The system as in claim 17, wherein said peripheral device is a display device.

24. The system as in claim 17, wherein encryption is performed using an orthogonal transformation.

25. The system as in claim 16, wherein the digital communications connector is to receive a public encryption key from said peripheral device and to transmit encrypted digital data to said peripheral device.

* * * * *

UNITED STATES PATENT AND TRADEMARK OFFICE
CERTIFICATE OF CORRECTION

| | | |
|---|---|---|
| PATENT NO. | : 7,089,426 B1 | Page 1 of 1 |
| APPLICATION NO. | : 09/669352 | |
| DATED | : August 8, 2006 | |
| INVENTOR(S) | : Stephen A. Bagshaw | |

It is certified that error appears in the above-identified patent and that said Letters Patent is hereby corrected as shown below:

Column 8, Line No. 63, change "The a video" to --The video--

Column 9, Line No. 23, change "fist" to --first--

Signed and Sealed this

Fifth Day of December, 2006

JON W. DUDAS
*Director of the United States Patent and Trademark Office*